United States Patent
Willis et al.

(10) Patent No.: US 10,089,484 B2
(45) Date of Patent: Oct. 2, 2018

(54) METHOD AND SYSTEM FOR DESTROYING SENSITIVE ENTERPRISE DATA ON PORTABLE DEVICES

(71) Applicant: QUEST SOFTWARE INC., Aliso Viejo, CA (US)

(72) Inventors: Tomas Willis, Madison, WI (US); Peter Travis terSteeg, New York, NY (US)

(73) Assignee: QUEST SOFTWARE INC., Aliso Viejo, CA (US)

( * ) Notice: Subject to any disclaimer, the term of this patent is extended or adjusted under 35 U.S.C. 154(b) by 336 days.

(21) Appl. No.: 14/645,393

(22) Filed: Mar. 11, 2015

(65) Prior Publication Data
US 2016/0267284 A1    Sep. 15, 2016

(51) Int. Cl.
*G06F 7/04* (2006.01)
*G06F 21/62* (2013.01)
*H04L 29/06* (2006.01)

(52) U.S. Cl.
CPC .......... *G06F 21/6218* (2013.01); *H04L 63/08* (2013.01); *G06F 2221/2139* (2013.01); *G06F 2221/2143* (2013.01)

(58) Field of Classification Search
CPC .............................. G06F 21/6218; H04L 63/08
See application file for complete search history.

(56) References Cited

U.S. PATENT DOCUMENTS

| | | | |
|---|---|---|---|
| 7,823,194 B2 | 10/2010 | Shay | |
| 9,419,841 B1* | 8/2016 | Kozolchyk | H04L 9/3239 |
| 2007/0300290 A1 | 12/2007 | Shay et al. | |
| 2011/0055571 A1 | 3/2011 | Gluck | |
| 2011/0113182 A1* | 5/2011 | Reyes | G06F 21/6209 711/102 |
| 2012/0148323 A1* | 6/2012 | Shimada | G06F 3/1204 400/76 |
| 2016/0088115 A1* | 3/2016 | Agnew | H04L 67/2842 709/206 |

OTHER PUBLICATIONS

U.S. Appl. No. 14/819,104, filed Aug. 5, 2015, Hui Ling, Unified Source User Checking of TCP Data Packets for Network Data Leakage Prevention.
U.S. Appl. No. 14/819,104 Office Action dated Mar. 8, 2017.

* cited by examiner

*Primary Examiner* — Farid Homayounmehr
*Assistant Examiner* — Suman Debnath
(74) *Attorney, Agent, or Firm* — Maschoff Brennan

(57) ABSTRACT

Systems and methods for destroying sensitive enterprise data on portable devices are provided. Such systems and methods may include providing a portable device that includes a security agent for deleting sensitive enterprise data. The security agent on the portable device can be required to regularly be authenticated by a user through an authentication server. The authentication server provides a pre-determined timeframe for which the user would need to re-authenticate. Failure by the user to re-authenticate within the pre-determined timeframe can result in the security agent proceeding with deleting the sensitive enterprise data on the portable device.

20 Claims, 4 Drawing Sheets

METHOD AND SYSTEM FOR DESTROYING SENSITIVE ENTERPRISE DATA ON PORTABLE DEVICES

BACKGROUND

Field of Invention

The present invention generally relates to information security. More specifically, the present invention relates to systems and methods directed at destroying sensitive enterprise data on portable devices.

Description of the Related Art

The use of portable (or mobile) devices are an increasing component in everyday life. This can be seen with the increasing number of people who own and use these mobile devices on a daily basis. Exemplary mobile devices may include smartphones, tablets, and laptops.

Mobile devices have also become more prolific when used in the work environment. This can arise when employees using their own mobile devices or when a company provides/assigns one or more mobile devices for their employees to use. There are many benefits for incorporating the use of mobile devices with work, such as allowing an employee to stay connected with work (e.g., email) or allowing an employee to work remotely (e.g., during travel).

The use of mobile devices in the workplace also comes with some concerns. Many times, the mobile devices used by employees for work are connected to a company network and/or contain work-related information. The work-related information can be confidential and/or sensitive information that the company may not want non-privileged individuals to access. Such information may include company e-mails, employee contact information, calendar events, company network login information, business plans, work-related notes, customer data, etc.

It should be no surprise then that the loss of corporate information is a major concern for companies when a work-related mobile device is lost, stolen, or otherwise made vulnerable to unauthorized access. To this end, extensive time and money have been spent on informing individuals on how to better protect their mobile devices and the potentially sensitive/confidential work-related information contained within their mobile device, as well as implementing various security measures to protect the mobile devices and work-related information.

There are a variety of existing methods aimed at implementing information security in mobile devices. More simplistic methods of implementing information security may include encrypting the sensitive information or enabling a password or passcode requirement to obtain access to the mobile device and/or sensitive information. With these methods, however, it is possible that the encryption and password/passcodes be solved or otherwise circumvented eventually, since the data remains on the device indefinitely.

Other methods of information security may also involve resetting the mobile device and/or deleting information on the mobile device in situations where the mobile device is misplaced and/or stolen. The user may request, for example, that instructions can be provided from the mobile device company to the mobile device to initiate a process whereby the mobile device can remotely delete information stored in the mobile device. The phone can alternatively be programmed to delete information stored within the phone if a third party individual enters a password incorrectly a pre-defined number of times. Although the information can be deleted, such safeguards can also be overcome. For example, the password can still be hacked and/or circumvented, thereby not triggering the deletion. In addition, the deletion may not be initiated if the third party keeps the mobile device from connecting with the mobile device company. With no instructions from the mobile device company, the mobile device itself would not know whether the device is still with the owner or a third party.

At this time, there does not appear to be any available security measures on the mobile devices aimed at deleting sensitive information (or resetting the entire mobile device) after a certain amount of time has elapsed without either user instruction and/or instruction from the mobile device company. Such measures may allow lost or stolen mobile devices to automatically erase sensitive data in order to provide further security measure so that third parties have less time to figure out and/or circumvent the security measures to obtain the sensitive information stored in the mobile device.

SUMMARY OF THE CLAIMED INVENTION

Embodiments of the present invention include systems and methods for destroying sensitive enterprise data on portable devices. Such systems and methods may include providing a portable device that includes a security agent for deleting sensitive enterprise data. The security agent on the portable device can be instructed to be regularly re-authenticated with an authentication server. The authentication server provides a pre-determined timeframe during which a user would need to re-authenticate. Failure by the user to authenticate within the pre-determined timeframe can result in an instruction to the security agent within the portable device to proceed with deleting the sensitive enterprise data on the portable device.

DETAILED DESCRIPTION

Systems and methods for destroying sensitive enterprise data on portable devices are described herein. In the following description, details are provided to explain various embodiments of the present invention. It should be noted, however, that the present invention may be practiced without some of the details provided. Some details may also be omitted for sake of simplifying/generalizing a particular embodiment of the present invention. Reference to embodiments of the present invention within the specification may mean that a particular feature, structure, or characteristic described in connection with the embodiment is included in at least one embodiment of the invention. There may be, however, other embodiments where that same feature, structure, or characteristic is not included but is still within the scope of the present invention.

Figure 1:
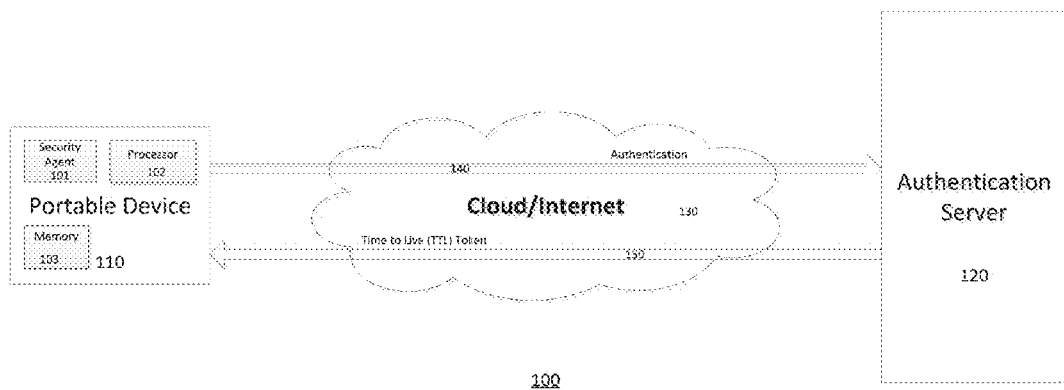
FIG. 1 illustrates a network environment in which an exemplary system for destroying sensitive enterprise data may be implemented.

FIG. 1 illustrates a network environment 100 in which an exemplary system for destroying sensitive enterprise data may be implemented. The system 100 includes one or more portable devices 110 (also referred to as mobile devices) and an authentication server 120. The portable devices 110 and the authentication server 120 can communicate with each other using the cloud/Internet 130. Communication can be conducted using any number of wireless communications known in the art (e.g., Wi-Fi, 3G, 4G, LTE).

The portable devices 110 can be any number of different types of devices available to the public. These devices may include smartphones, laptops, tablets, or any other mobile device. Generally, these portable devices 110 are able to connect to a work-related server using the internet. These portable devices 110 can also include a processor 102 and memory 103. In particular, the memory 103 of the portable devices 110 can be used to store work-related data.

The portable devices 110 may also include a security agent 101. Further details about the security agent 101 will be provided below. For now, the security agent 101 can be a hardware and/or software component installed in the portable device 110 (or a feature built in to the particular portable device 110 configured to delete some or all information stored in memory 103 on the portable device 110 in accordance with certain conditions. In particular, the security agent 101 can be instructed to proceed with deleting information after a pre-determined period of time has elapsed according to the present disclosure.

It should be noted that the security agent 101 can also be configured and deployed by an administrator at the company. The administrator of the company may configure the security agent to perform various functionalities described in further detail below. An exemplary functionality may include identifying what data to specifically destroy. In other words, not all data within a portable device 110 may be subject to destruction by the security agent 101.

As shown in FIG. 1, the authentication server 120 is also provided. The authentication server can be a computer system. The authentication server 120 may include a security program (not shown). The security may perform various functionalities including storing information about connected portable devices, storing information about what protected content is stored on a particular connected portable device, and storing and updating timestamps related to authentication requests from the security agents on the portable devices.

The authentication server 120 may be stored in the cloud or Internet. In another embodiment, the authentication server may be located at the data center for the company. A company can decide where the authentication server 120 could be best located based on the particular security needs for the company.

The security program included with the authentication server 120 may similarly be stored in the cloud or Internet where the authentication server may access when needed. In another embodiment, the security program can be stored in a physical computer system located at the data center for the company (e.g., stored within a computer system corresponding to the authentication server 120). The choice, as described above, can be performed by the company based on the particular security needs for that company.

Generally, the authentication server 120 facilitates the security measure of the present application along with the security agent 101 to ensure that the user maintains present control over their portable device 110 that may have sensitive work-related information stored in memory 103.

Figure 2:
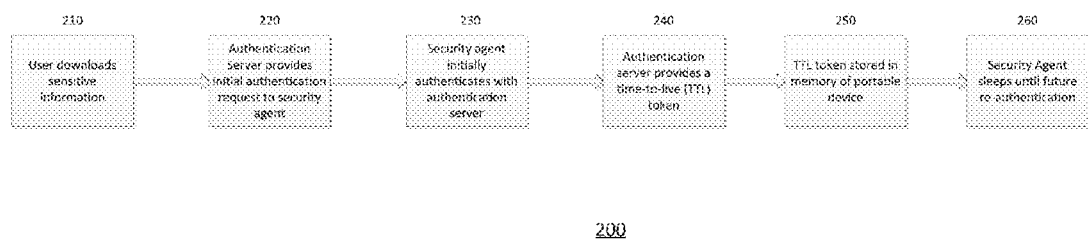
FIG. 2 is a flowchart illustrating an initial authentication between a security agent and the authentication server that may occur in an exemplary method for destroying sensitive enterprise data.

FIG. 2 is a flowchart illustrating an initial authentication 200 between a security agent and the authentication server that may occur in an exemplary method for destroying sensitive enterprise data. The initial authentication 200 may be triggered when the user attempts to download sensitive work-related information onto their portable device 210. In another embodiment, the initial authentication 200 may also take place when the security agent on the portable device is first activated. The purpose of the initial authentication 200 is to provide a first "time-to-live" (TTL) token 240 (described in further detail below) to be associated with the corresponding sensitive information just downloaded.

Various embodiments may be possible depending on corresponding capabilities of the portable device being used. In an embodiment, the TTL token may be tied to instructions for a blanket destruction of all data on the portable device. In another embodiment, destruction of data on the portable device may target configured folders. The folders may have been pre-selected for destruction by the company administrator.

In a further embodiment, destruction of data may target various subsets of data. Particular subsets of data, additionally, may have different TTL tokens assigned in comparison to other subsets of data stored in the portable device. In other words, certain folders or individual files may have different TLL tokens associated with them. The use of different TTL tokens for different folders and/or files in the portable device may provide different times in which a particular file may be destroyed. The destruction may be performed in a granular or selective fashion.

In various embodiments according to the present invention, the authentication server may handle the initial authentication for multiple download of sensitive work-related information in a number of ways. For example, the authentication server can be instructed to perform an initial authentication for each instance of a user downloading sensitive work-related information. In doing so, a unique TTL token can be provided for each set of downloaded sensitive work-related information. Alternatively, a new TTL token can be provided for all information stored in the portable device (inclusive of previously downloaded sensitive work-related information and the recently downloaded sensitive work-related information). Furthermore, additional downloaded sensitive work-related information may be stored in the portable device and associated with an already existing TTL token.

During the initial authentication 200, the authentication server may request an initial authentication 220 from the security agent within the portable device in connection with a download of sensitive work-related information 210. In various embodiments, different types of authentication may be used to secure the communication between the authentication sever and authentication agent. These different types of authentication may include using a password and/or passcode authentication, communication encryption over a virtual private network (VPN) and using the hardware address and serial number of the portable device. The authentication server may store information regarding the authentication used with the portable device in a database. The authentication data may be stored along with identification of other portable devices in communication with the authentication server. The authentication data may also be stored along with information relating to corresponding TTL token, timestamps and identity of sensitive data downloaded for the portable device Upon receiving the initial authentication request 220 from the authentication server, the security agent may initially authenticate with the authentication server 230. The authentication can be performed as described above.

Once authentication has been performed between the security agent and the authentication server, the authentication server can then provide a TTL token 240. Generally, the TTL token assigned to the portable device will include various types of information. The TTL token may include information regarding what types of information may be deleted, in other words the scope that the particular TTL token is applied to. The TTL token may also include the timeframe by which re-authentication may need to be performed.

The information associated with the TTL token (e.g., scope and timeframe) may be stored in the memory of the portable device. In an embodiment, the information associated with the TTL tokens may be encrypted and hidden in the file system and memory of the portable device. The authentication server may also store the information associated with the TTL token.

As indicated above, once the TTL token has been assigned to the portable device, the TTL token may then be stored in memory of the portable device 250. Storing the information of the TTL token in the portable device 250 may allow the portable device to determine whether the information stored in the portable device should be deleted. The user may also be able to view information about the TTL token on the portable device. For example, the user may be provided reminders as to what types of sensitive information are being stored in the portable device and a countdown until the next re-authentication.

After the TTL token has been stored in the portable device, the security agent may go to sleep 260. The security agent may cede processing functionality to the portable device until a time comes where the user initiates the security agent again or conditions arise (e.g., time frame expires thereby requiring that associated data be deleted) that necessitates initiation of the security agent.

The TTL token allows the authentication server to provide instructions to the security device of the portable device to re-authenticate within a pre-determined time period. This pre-determined time period can be provided to the user to view (e.g., via a display on the portable device). In situations where the user re-authenticates successfully within the pre-determined timeframe, the authentication server can reissue another TTL token. The new TTL token may provide another pre-determined timeframe by which the user would need to re-authenticate. Therefore, the cycle of re-authenticating and receiving a new TTL token can continue until either the information maintained on the portable device is deleted or the authentication server deactivates the security measure.

Although deactivation may be possible, generally this option is controlled by the authentication server administrator. In another embodiment, deactivation may be implemented by providing a next TTL token that may have an indefinite time duration. In other words, the user may not be required to re-authenticate but the new TTL token may still contain information identifying, for example, the sensitive data that can be stored on the portable device and/or the authentication server.

In other situations where the user fails to re-authenticate within the pre-determined timeframe, the security agent can be directed to delete some or all the information in the portable device. The timeframe can be monitored using an internal clock or other timing functionality built into the portable device. In an embodiment, as time is about to expire for a particular TTL token, the security agent may automatically initiate and attempt to re-authenticate with the authentication server. The re-authentication may be attempted one or more times, as configured by the company administrator. In another embodiment, the security agent may inform the user that re-authentication is requested soon in order to prompt the user to perform the re-authentication.

In any case, if the re-authentication does not occur for one or more different reasons (e.g., no connectivity with the authentication server, improper re-authentication), the security agent may not receive a new TTL token with a new timeframe. Once the time frame for the existing TTL token expires, the security agent may proceed with deleting corresponding data once the timeframe for the existing TTL token expires. Once the deletion occurs, the security agent, in one embodiment, may inform the authentication server that deletion had occurred. This update on the status of the sensitive information stored in the portable device may be performed at the next opportunity the security agent can communicate with the authentication server (e.g., once connectivity has been restored).

As indicated above, the information deleted can include specific sensitive or confidential files, groups of files that fall under a particular class or stored in a particular folder, or all the information stored in the portable device (resembling a factory reset). The security device can subsequently inform the user (e.g., via a display on the portable device) that information has been deleted from the portable device based on a failure to re-authenticate within the pre-defined timeframe.

In some embodiments, one or more warnings may be provided at various times prior to the expiration of the pre-defined timeframe. Such warnings may remind the user that re-authentication is needed and that data may be subject to being deleted. These warnings can be provided by the authentication server and/or security agent default settings (e.g., pre-set warnings) or set up by the user (e.g., customizable warnings). Information about the expiration of the pre-determined timeframe can be conveyed to the user any number of ways (e.g., text, e-mail, calendar event, visual graphic on the display, ongoing timer).

The pre-determined timeframe corresponding to the TTL token instructing the security agent to re-authenticate may depend on various parameters. Generally, the time period can be chosen to be any arbitrary period of time (e.g., hourly, daily, weekly, etc. . . . ). The pre-determined timeframe selected can also be set by the authentication server. The authentication server can be programmed to evaluate one or more parameters when assigning the pre-determined timeframe. Some parameters that may be considered in determining the pre-determined timeframe may include the type of information being stored on the mobile device, the purpose the information may be used for (e.g., remote work, presentation), who has the information, and user capability to re-authenticate. There may be other factors and parameters not listed that can be considered in making a determination as to how soon a user may need to re-authenticate. In any case, the various factors, parameters and algorithms that can be used for determining what appropriate TTL token could be used may be stored on the authentication server. In another embodiment, the authentication server administrator can configure the various parameters for TTL tokens at a global level (e.g., assigning blanket parameters for all portable devices or for particular sets of data) or provide parameters for specific portable devices.

The security agent may also have one or more safeguards aimed at preventing tampering with by unauthorized individuals. Generally, the security agent may not be disabled on the user mobile device.

These safeguards may include hiding the program from user access, embedding the security agent in firmware of the portable device, prohibiting uninstall of the security agent, causing the security agent to be automatically reinstalled on the portable device from read-only memory or from the network if the security agent had been removed or tampered with.

Figure 3:
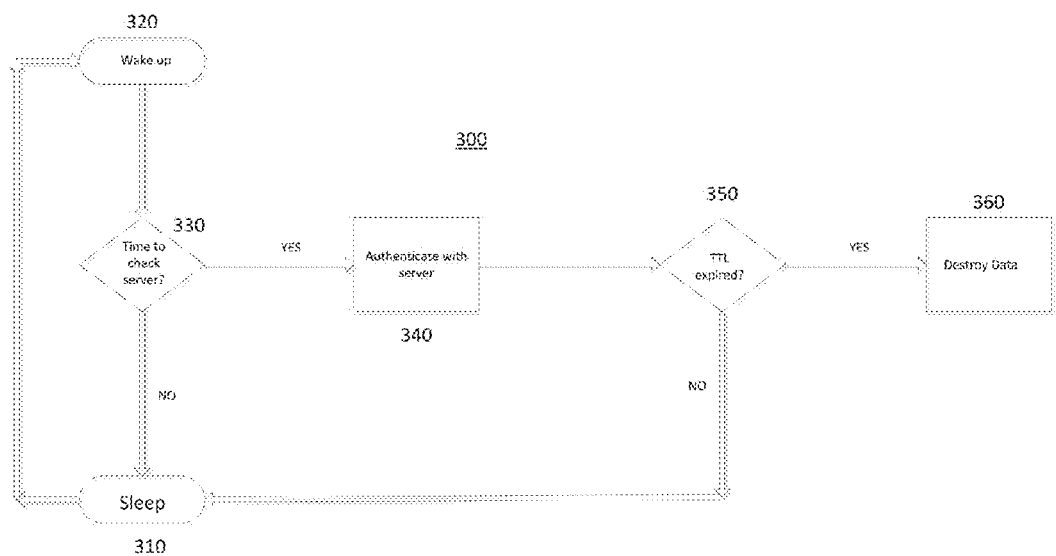
FIG. 3 is a flowchart illustrating an exemplary method for destroying sensitive enterprise data.

FIG. 3 is a flowchart illustrating an exemplary method for destroying sensitive enterprise data. The security agent may constantly be running in the background of the mobile device until the user initiates the security agent to begin re-authentication with the authentication server. During the time period where authentication is not being performed, the security agent may continually switch between sleep mode 310 and wake up mode 320. Wake up mode 320 can be initiated to determine if the user has initiated any sort of re-authentication request 330. If no request has been made, the security agent can return to sleep 310. The switch between sleep mode 310 and wake mode 320 can occur at regular intervals or be triggered by certain conditions.

Once the security agent detects a re-authentication request 330, authentication is attempted between the security agent and the authentication server 340. The security agent can then determine if the timeframe between the current re-authentication and the previous authentication has been exceeded 350. For example, if the user is required to re-authenticate with the authentication server every 24 hours, the security agent can check to see if the time between the previous authentication and the pending re-authentication falls within a 24 hour window.

In situations where the window has been exceeded, the data can be erased 360 as described above. Whether the user forgot to re-authenticate, was unable to re-authenticate due to connection issues with the authentication server or through losing the portable device, or when a third party who has gained control to the mobile device was unable to successfully authenticate within the pre-defined time period, the data can be erased all the same. In another embodiment of the present invention, the data to be erased could be encrypted prior to deletion. This additional step of encryption may provide another level of security in reducing the ability of non-privileged individuals to retrieve the deleted information.

If the user has properly re-authenticated within the pre-determined timeframe identified in the TTL token, the authentication server can then provide a new TTL token instructing the user and the security agent the next timeframe for re-authentication. Once the security agent receives the new TTL token from the authentication server, the overall process described above repeats from the beginning with the security agent waiting for the user to initiate re-authentication proceedings. In other words, the cycle of re-authentication of the security agent with the authentication server repeats until either the information is deleted from the mobile device or the authentication server does not require future re-authentication. In other embodiments, re-authentication may be disabled by making the authentication server aware that the information stored in the mobile device is no longer at risk of being lost or stolen (e.g., the user returns from a trip or the mobile device has been returned to the company who owns the authentication server).

Figure 4:
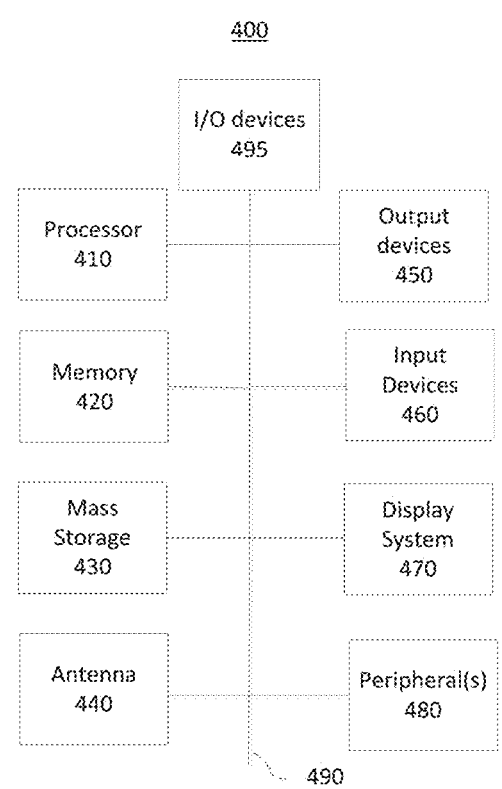
FIG. 4 illustrates a block diagram of a computing device that may be used to implement various embodiments of the present invention.

FIG. 4 illustrates a block diagram of a computing device that may be used to implement various embodiments of the present invention. While exemplary computing system 400 may be used to implement a computing device with the present technology, all features shown may not be included where a gateway or a firewall may be implementing the present invention. The computing system 400 of FIG. 4 may be implemented in the contexts of the likes of clients and servers. The computing system 400 of FIG. 4 includes one or more processors 410 and memory 420. The memory 420 may store, in part, instructions and data for execution by processor 410. The memory 420 can also store the executable code when in operation. The computing system 400 of FIG. 4 further includes a mass storage device 430, which may include resident mass storage and portable storage, antenna 440, output devices 450, user input devices 460, a display system 470, peripheral device(s) 480, and I/O devices 495.

The components shown in FIG. 4 are depicted as being connected via a single bus 490. However, the components may be connected through one or more data transport means. For example, the processor unit 410 and memory 420 may be connected via a local microprocessor bus, and the storage 430, peripheral device(s) 480, and the display system 470 may be connected via one or more input/output (I/O) buses 495.

The mass storage device 430 may include mass storage implemented with a magnetic disk drive, an optical disk drive, FLASH memory, or be a portable USB data storage device. The mass storage device 430 can store the system software for implementing embodiments of the present invention for purposes of loading that software into memory 420. The system software for implementing embodiments of the present invention may be stored on such a portable medium and input to the computing system 400 via the portable storage device.

The antenna 440 may include one or more antennas for communicating wirelessly with another device. The antenna 440 may be used, for example, to communicate wirelessly via Wi-Fi, Bluetooth, with a cellular network, or with other wireless protocols and systems. The one or more antennas may be controlled by the processor 410, which may include a controller, to transmit and receive wireless signals. For example, the processor 410 executes programs stored in memory 420 to control the antenna 440, transmit a wireless signal to a cellular network, and receive a wireless signal from the cellular network. Even though firewalls do not typically include an antenna and do not support receiving and transmitting wireless communications, a firewall consistent with the present invention could include wireless communications.

The system 400 as shown in FIG. 4 may include output devices 450 and input devices 460. Examples of suitable output devices include speakers, printers, and monitors. Examples of suitable input devices 460 may include a microphone, accelerometers, a camera, and other devices. Input devices 460 may also include an alpha-numeric keypad, such as a keyboard, for inputting alpha-numeric and other information, or a pointing device, such as a mouse, a trackball, stylus, or cursor direction keys. Example I/O devices 495 may include network interfaces, and touch screens. Exemplary network interfaces used in the present invention may be any computer network (wired or wireless) known in the art, including, yet are not limited to Ethernet, or 802.11.

The display system 470 may include a liquid crystal display (LCD), LED display, a plasma display, or be another suitable display device. The display system 470 receives textual and graphical information, and processes the information for output to the display device.

The peripherals 480 may include any type of computer support device to add additional functionality to the computer system. For example, the peripheral device(s) 480 may include a modem or a router.

The components contained in the computing system 400 of FIG. 4 are those typically found in a computing system, such as but not limited to a gateway, a firewall, a desktop computer, a laptop computer, a notebook computer, a netbook computer, a tablet computer, a smart phone, a personal data assistant (PDA), or other computer that may be suitable for use with embodiments of the present invention and are intended to represent a broad category of such computer components that are well known in the art. Thus, the computing system 400 of FIG. 4 can be a personal computer, hand held computing device, telephone, mobile computing device, workstation, server, minicomputer, mainframe computer, gateway, firewall, or any other computing device. The computer can also include different bus configurations, networked platforms, multi-processor platforms, etc. Various operating systems can be used including but not limited to Unix, Linux, Windows, Macintosh OS, Palm OS, Android OS, and Apple iOS.

The various methods may be performed by software operating in conjunction with hardware. For example, instructions executed by a processor, the instructions otherwise stored in a non-transitory computer readable medium such as memory. Various interfaces may be implemented—both communications and interface. One skilled in the art will appreciate the various requisite components of a mobile device and integration of the same with one or more of the foregoing figures and/or descriptions.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for destroying sensitive enterprise data on a portable device, the method comprising:
   downloading the sensitive enterprise data from an authentication server, the downloaded sensitive enterprise data being associated with a pre-determined authentication timeframe, wherein the sensitive enterprise data downloaded from the authentication server is characterized as a type of sensitive data;
   storing the downloaded sensitive enterprise data into memory;
   initially authenticating a security agent in the portable device with the authentication server associated with the downloaded sensitive enterprise data, wherein the initial authentication includes receiving a token from the authentication server, wherein the token includes information pertaining to what sensitive enterprise data may be destroyed and the pre-determined authentication timeframe by which a re-authentication of the security agent with the authentication server is to occur, wherein the initial authentication initiates the pre-determined authentication timeframe specifying that a next re-authentication be performed, wherein the pre-determined authentication timeframe corresponds to one or more parameters that relate to the type that characterizes the sensitive enterprise data;
   accessing the token to determine the pre-determined authentication timeframe; and
   triggering destruction of the downloaded sensitive enterprise data when the pre-determined authentication timeframe expires without re-authentication of the security agent with the authentication server.

2. The method of claim 1, further comprising identifying when the pre-determined timeframe expires by:
   measuring an elapsed time from a prior authentication to a current time; and
   identifying that the elapsed time exceeds the predetermined authentication time-frame associated with the downloaded sensitive enterprise data, the pre-determined authentication time-frame specifying when a next re-authentication is to be performed.

3. The method of claim 1, wherein triggering destruction of the downloaded sensitive enterprise data comprises deleting the downloaded sensitive enterprise data from memory of the portable device.

4. The method of claim 1, further comprising encrypting the downloaded sensitive enterprise data prior to triggering destruction.

5. The method of claim 1, wherein the pre-determined timeframe is based on at least one factor selected from the group consisting sensitivity level of the downloaded sensitive enterprise data, identity of a user of the portable device, reason for download, ability of the user to re-authenticate, and duration that the downloaded sensitive enterprise data can be used.

6. The method of claim 1, further comprising initiating safety protocols when the portable device is detected as having been tampered with, wherein the safety protocols comprise at least one of disabling user access to the portable device, disabling user access to the downloaded sensitive enterprise data, and deleting at least part of the downloaded sensitive enterprise data from the portable device.

7. The method of claim 1, further comprising providing a notification regarding a current pre-determined timeframe to a user of the portable device via a display.

8. The method of claim 1, wherein the downloaded sensitive enterprise data includes a plurality of files, and wherein each of the files is associated with the different pre-determined authentication timeframe.

9. The method of claim 8, wherein triggering destruction applies to a selected subset of the downloaded sensitive enterprise data, and wherein another subset of the downloaded sensitive enterprise data is not destroyed.

10. A method for securing sensitive enterprise data on a portable device, the method comprising:
    downloading the sensitive enterprise data from an authentication server, the downloaded sensitive enterprise data being associated with a pre-determined authentication timeframe, wherein the sensitive enterprise data downloaded from the authentication server is characterized as a type of sensitive data;
    storing the downloaded sensitive enterprise data into memory;
    initially authenticating a security agent in the portable device with the authentication server associated with the downloaded sensitive enterprise data, wherein the initial authentication includes receiving a token from the authentication server, wherein the token includes information pertaining to what sensitive enterprise data may be destroyed and the pre-determined authentication timeframe by which a re-authentication of the security agent with the authentication server is to occur, wherein the initial authentication initiates the pre-determined authentication timeframe specifying that a next re-authentication be performed, wherein the pre-determined authentication timeframe corresponds to one or more parameters that relate to the type that characterizes the sensitive enterprise data;

accessing the token to determine the pre-determined authentication timeframe;

re-authenticating with the authentication server within the pre-determined authentication timeframe; and renewing the pre-determined authentication timeframe specifying a next re-authentication to be performed.

11. The method of claim 10, wherein re-authenticating is based on a user providing re-authentication information into the user portable device, and wherein re-authenticating further comprises forwarding the re-authentication information to the authentication server through use of the security agent.

12. A system for destroying sensitive enterprise data on a portable device, the system comprising:

an authentication server; and a portable device, the portable device including a processor and memory, wherein the processor executes instructions stored in memory to:

download sensitive enterprise data from the authentication server, the downloaded sensitive enterprise data being associated with a pre-determined authentication timeframe, wherein the sensitive enterprise data downloaded from the authentication server is characterized as a type of sensitive data, store the downloaded sensitive enterprise data in memory, initially authenticate a security agent in the portable device with the authentication server associated with the downloaded sensitive enterprise data, wherein the initial authentication includes receiving a token from the authentication server, wherein the token includes information pertaining to what sensitive enterprise data may be destroyed and the pre-determined authentication timeframe by which a re-authentication of the security agent with the authentication server is to occur, wherein the initial authentication initiates the pre-determined authentication timeframe specifying that a next re-authentication be performed, wherein the pre-determined authentication timeframe corresponds to one or more parameters that relate to the type that characterizes the sensitive enterprise data, access the token to determine the pre-determined authentication timeframe, and trigger destruction of the downloaded sensitive enterprise data when the pre-determined authentication timeframe expires without re-authentication by the security agent with the authentication server.

13. The system of claim 12, wherein the processor identifies when the pre-determined timeframe expires corresponds to by:

measuring an elapsed time from a prior authentication to a current time; and identifying that the elapsed time exceeds the predetermined authentication time-frame associated with the downloaded sensitive enterprise data, the pre-determined authentication time-frame specifying when a next re-authentication is to be performed.

14. The system of claim 12, wherein triggering destruction of the downloaded sensitive enterprise data comprises deleting the downloaded sensitive enterprise data from memory of the portable device.

15. The system of claim 12, wherein the processor encrypts the downloaded sensitive enterprise data prior to triggering destruction.

16. The system of claim 12, wherein the pre-determined timeframe is based on at least one factor selected from the group consisting sensitivity level of the downloaded sensitive enterprise data, identity of a user of the portable device, reason for download, ability of the user to re-authenticate, and duration that the downloaded sensitive enterprise data can be used.

17. The system of claim 12, wherein the processor initiates safety protocols when the portable device is detected as having been tampered with, wherein the safety protocols comprise at least one of disabling user access to the portable device, disabling user access to the downloaded sensitive enterprise data, and deleting at least part of the downloaded sensitive enterprise data from the portable device.

18. The system of claim 12, wherein the process provides a notification regarding a current pre-determined timeframe to a user of the portable device via a display.

19. A system for securing sensitive enterprise data on a portable device, the system comprising:

an authentication server; and a portable device, the portable device including a processor and memory, wherein the processor executes instructions stored in memory to:

download sensitive enterprise data from the authentication server, the downloaded sensitive enterprise data being associated with a pre-determined authentication timeframe, wherein the sensitive enterprise data downloaded from the authentication server is characterized as a type of sensitive data;

store the downloaded sensitive enterprise data into memory;

initially authenticate a security agent in the portable device with the authentication server associated with the downloaded sensitive enterprise data, wherein the initial authentication includes receiving a token from the authentication server, wherein the token includes information pertaining to what sensitive enterprise data may be destroyed and the pre-determined authentication timeframe by which a re-authentication of the security agent with the authentication server is to occur, wherein the initial authentication initiates the pre-determined authentication timeframe specifying that a next re-authentication be performed, wherein the pre-determined authentication timeframe corresponds to one or more parameters that relate to the type that characterizes the downloaded sensitive enterprise data; and access the token to determine the pre-determined authentication timeframe;

re-authenticate with the authentication server within the pre-determined authentication timeframe; and renew the pre-determined authentication timeframe specifying a next re-authentication to be performed.

20. The system of claim 19, wherein re-authenticating is based on a user providing re-authentication information into the user portable device, and wherein re-authenticating further comprises forwarding the re-authentication information to the authentication server through use of the security agent.

* * * * *